US012242626B2

(12) United States Patent
Thakur et al.

(10) Patent No.: US 12,242,626 B2
(45) Date of Patent: Mar. 4, 2025

(54) FRAMEWORK FOR PUSHING ACCESS-PRIVILEGE INFORMATION FROM DATA ENVIRONMENTS

(71) Applicant: Veza Technologies, Inc., Los Gatos, CA (US)

(72) Inventors: Tarun Thakur, Los Gatos, CA (US); Maohua Lu, Fremont, CA (US)

(73) Assignee: Veza Technologies, Inc., Los Gatos, CA (US)

(*) Notice: Subject to any disclaimer, the term of this patent is extended or adjusted under 35 U.S.C. 154(b) by 229 days.

(21) Appl. No.: 17/736,308

(22) Filed: May 4, 2022

(65) Prior Publication Data

US 2022/0358233 A1 Nov. 10, 2022

Related U.S. Application Data

(60) Provisional application No. 63/183,773, filed on May 4, 2021.

(51) Int. Cl.
*G06F 21/62* (2013.01)
*G06F 9/54* (2006.01)
*G06F 21/31* (2013.01)

(52) U.S. Cl.
CPC ............ *G06F 21/6218* (2013.01); *G06F 9/54* (2013.01); *G06F 21/31* (2013.01); *G06F 2221/2141* (2013.01)

(58) Field of Classification Search
CPC ........ G06F 21/6218; G06F 21/31; G06F 9/54; G06F 2221/2141
See application file for complete search history.

(56) References Cited

U.S. PATENT DOCUMENTS

| 10,432,639 B1* | 10/2019 | Bebee ............... G06F 16/90335 |
| 11,108,828 B1* | 8/2021 | Curtis .................... H04L 63/20 |
| 2020/0125543 A1* | 4/2020 | Zhang ................ G06F 21/6218 |
| 2020/0280564 A1* | 9/2020 | Badawy ............... H04L 63/102 |
| 2022/0019579 A1* | 1/2022 | Meyerzon ............. G06N 5/022 |
| 2023/0153355 A1* | 5/2023 | Crabtree ............ G06F 16/2272 |
| | | 706/45 |

OTHER PUBLICATIONS

A Comprehensive Analysis of the Android Permissions System, by Almomani et al., published 2020 (Year: 2020).*

* cited by examiner

*Primary Examiner* — Vu V Tran

(57) ABSTRACT

The technology disclosed herein enables pushing of access-privilege information from data environments to a graphing service. In a particular embodiment, a method includes registering a data environment to enable the data environment to use Application Programming Interface (API) calls and receiving an API call transmitted from the data environment. The API call provides information about access permissions for the data environment. The method further includes incorporating the information into a privilege graph representing data access authorizations.

18 Claims, 8 Drawing Sheets

FRAMEWORK FOR PUSHING ACCESS-PRIVILEGE INFORMATION FROM DATA ENVIRONMENTS

RELATED APPLICATIONS

This application is related to and claims priority to U.S. Provisional Patent Application 63/183,773, titled "Authorization Framework For Pushing Authorization Information From Application And Data Systems," filed May 4, 2021, and which is hereby incorporated by reference in its entirety.

BACKGROUND

Modern enterprises use numerous data environments to store, manage, and/or process data and those environments may be managed by different systems, applications, and/or platforms from different providers and each may use its own data repository (e.g., database). For instance, different departments may employ different database systems depending on the features offered by the respective system (e.g., accounting may use a first database system while human resources uses a second). In some cases, a single department may itself use multiple platforms for data repositories depending on the capabilities of each platform even if the platforms manage similar data sets. For example, human resources may use one platform to onboard and terminate employees from the enterprise while another platform is used to handle employees' compensation and benefits. The repositories may be hosted local to the enterprise (i.e., at one or more of the enterprise's own facilities) or may be cloud based and hosted by third parties. Likewise, the cardinality of the data environments and the data therein can be very high (on the order of thousands of individual elements, such as data tables, to which a user can potentially access), which makes it very difficult (if not impossible) for a human administrator to track which data can be accessed by which users.

SUMMARY

The technology disclosed herein enables pushing of access-privilege information from data environments to a graphing service. In a particular embodiment, a method includes registering a data environment to enable the data environment to use Application Programming Interface (API) calls and receiving an API call transmitted from the data environment. The API call provides information about access permissions for the data environment. The method further includes incorporating the information into a privilege graph representing data access authorizations.

In some examples, the information comprises an incremental update of the access permissions since a previous instance of the API call was received from the data environment.

In some examples, the data environment transmitted the API call after a time has elapsed since a previous instance of the API call was transmitted.

In some examples, the data environment transmitted the API call in response to a change in the access permissions.

In some examples, the method includes providing a token to the data environment, wherein the token is included with the API call to authenticate the data environment.

In some examples, the method includes binding the data environment to a type of data environment, wherein the type corresponds to a template to which the information conforms.

In some examples, the method includes registering a data source of the data environment, wherein the API call includes a first identifier for the data source and a second identifier for the data environment.

In some examples, incorporating the information into the privilege graph includes forming a subgraph of the information and combining the subgraph into the privilege graph. In those examples, the method may include, before combining the subgraph into the privilege graph, translating the subgraph into a canonical schema used by the privilege graph.

In another example, an apparatus is provided having one or more computer readable storage media and a processing system operatively coupled with the one or more computer readable storage media. Program instructions stored on the one or more computer readable storage media, when read and executed by the processing system, direct the apparatus to register a data environment to enable the data environment to use Application Programming Interface (API) calls and receive an API call transmitted from the data environment. The API call provides information about access permissions for the data environment. The method further includes incorporate the information into a privilege graph representing data access authorizations.

DETAILED DESCRIPTION

Different data environments may use different mechanisms to regulate which users have access to which data sources (e.g., applications, application features, data sets, etc.) therein. That is, the mechanisms regulate the privileges that each user has for accessing each data environment and prevent users who are not authorized to access certain features or data from doing so. As such, each environment needs to receive information defining the privileges for each user that is authorized to access at least a portion of the features/data available therefrom. To track privileges across a multitude of data environments, the graphing service described herein uses a privilege graph to track users and corresponding privileges. The privilege graph, when displayed to a user, graphically represents the associations between authorizations, users, groups, etc. within an entity (e.g., the user's employer), which enables the user to easily comprehend the nature of authorizations for the entity.

In some examples, the graphing service may be preconfigured to access privilege information maintained by a data environment for incorporation into the privilege graph. Pre-configuring the graphing service to perform in such a manner may only be practical for data environments from more popular vendors. Users of the graphing service are more likely to use a more popular vendor, which enables a provider of the graphing service incentive to expend the resources necessary to preconfigure the graphing service for data environments from that vendor. However, there are numerous other data environments that may not be as popular and new environments may join the market. Rather than relying on the provider of the graphing service to configure the graphing service to access an as yet unsupported data environment, the graphing service described below includes an Application Programming Interface (API) framework to receive privilege information from the unsupported data environment. While a user will need to implement the framework in the data environment, the user will not have to wait for pre-configured support to be implemented by the graphing service, especially since that support may never come.

Figure 1:
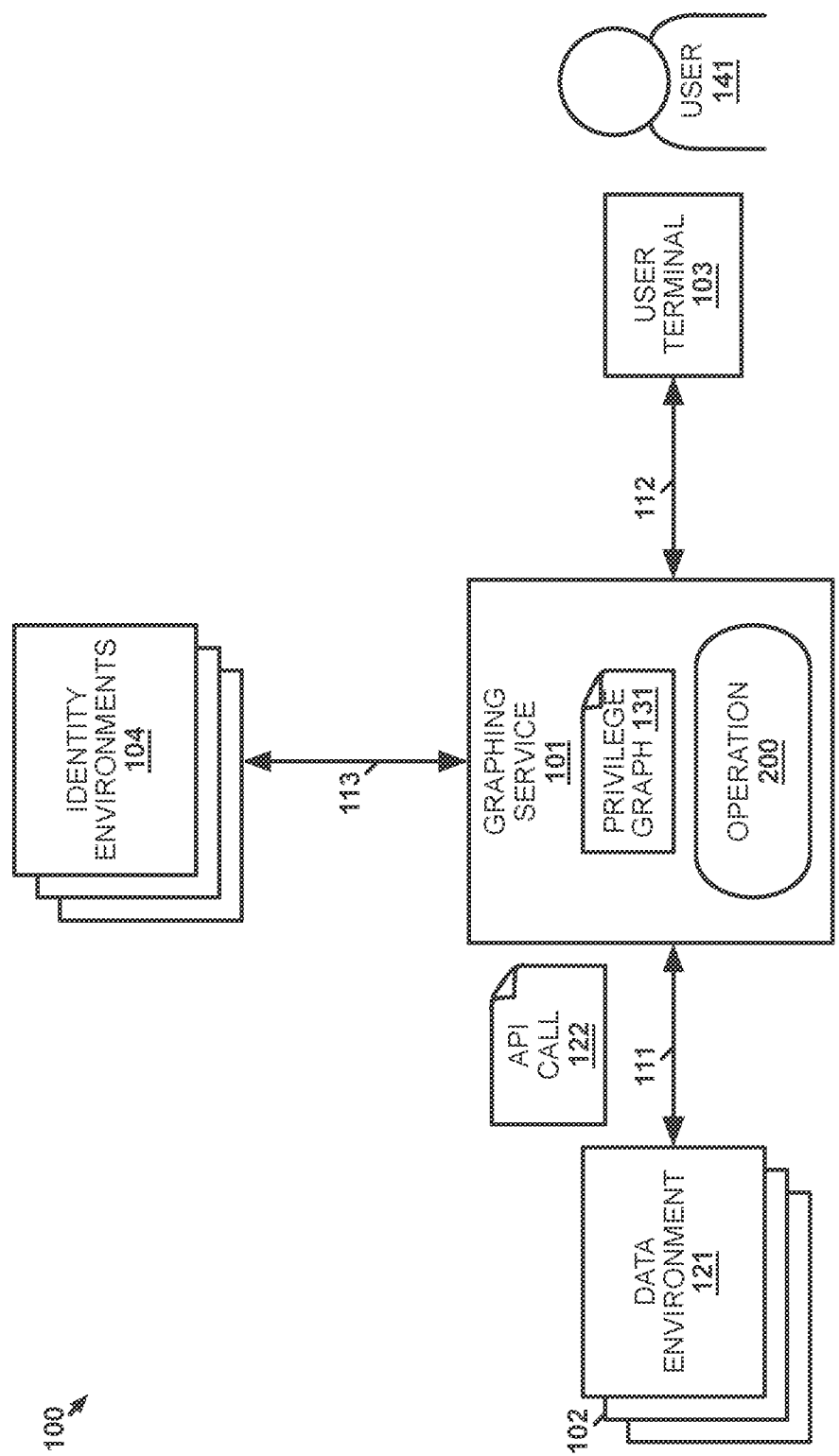
FIG. 1 illustrates an implementation for pushing access-privilege from data environments to a graphing service.

FIG. 1 illustrates implementation 100 for pushing access-privilege from data environments to a graphing service. Implementation 100 includes graphing service 101, data environments 102, user terminal 103, and identity environments 104. Data environments 102 includes data environment 121. Graphing service 101 and data environments 102 communicate over respective communication links 111. Graphing service 101 and user terminal 103 communicate over communication link 112. Graphing service 101 and identity environments 104 communicate over respective communication links 113. While communication links 111-113 are shown as direct links, communication links 111-113 may include intervening systems, networks, and/or devices. Graphing service 101 executes on one or more computing systems, such as server systems, having processing and communication circuitry to operate as described below. User terminal 103 is a user operated computing system, such as a desktop workstation, laptop, tablet computer, smartphone, etc., that user 141 uses to access data environments 102 and/or graphing service 101.

In operation, graphing service 101 generates privilege graph 131 to which tracks authorizations defined in identity environments 104 and corresponding ones of data environments 102. Identity environments 104 include one or more systems that maintain information about users (e.g., user identity information, user attributes, etc.) and information about which of data environments (including specific data/features therein) each user is allowed to access. Identity environments 104 may include an active directory (AD) server, a privilege account management (PAM) system, human resources management system (HRMS), identity and access governance (IAG) system, cloud-based identity access management system, or any other type of system that maintains the user information discussed above. By tracking the authorization of many, if not all, users in an organization (e.g., business enterprise), privilege graph 131 is able to not only represent authorizations for particular users but also represent authorizations based on attributes of users (e.g., the user's role and/or group). The users may include human users, such as user 141, non-human users (such as applications, micro-services, etc.), or some combination thereof. Privilege graph 131 may be stored local to graphing service 101 or may be accessible to graphing service 101 from an external data repository, which may itself be managed by one of data environments 102. Graphing service 101 performs operation 200, described below, incorporate access privilege information from data environment 121, which graphing service 101 is not preconfigured to automatically retrieve access privilege information therefrom. Other data environments of data environments 102 may similarly provide access privilege information to graphing service 101 using the mechanism described by operation 200.

Figure 2:
FIG. 2 illustrates an operation to push access-privilege from data environments to a graphing service.

FIG. 2 illustrates operation 200 to push access-privilege from data environments to a graphing service. In operation 200, graphing service 101 registers data environment 121 therewith to enable data environment 121 to use API calls to graphing service 101 (201). The API framework supported by graphing service 101 enables data environment 121 to use one or more predefined API calls to interact with graphing service 101. To interact with the API of graphing service 101, data environment 121 is configured to generate and transmit API calls that conform to the requirements of graphing service 101's API (e.g., conforms to any data formatting or information-type requirements for the API calls). Data environment 121 is registered with graphing service 101 so that graphing service 101 knows an API call is being received from data environment 121, specifically, and that data environment 121 is authorized to make API calls to graphing service 101.

In some examples, a registration API call may be transmitted from data environment 121 to graphing service 101 to trigger data environment 121's registration therewith. The registration API call may identify data environment 121 to graphing service 101. The registration API call may provide a name/identifier for data environment 121, may provide information about data environment 121 (e.g., a type of data environment, specifications for data environment 121, or some other information relevant to graphing service 101—including combinations thereof). The registration API call may further include credentials, such as a username and password combination, that indicates to graphing service 101 that data environment 121 is authorized to interact with data environment 121. In other examples, a user of graphing service 101, such as user 141, may input information about graphing service 101 (e.g., a name/identifier, environment type, etc.) into graphing service 101 to trigger data environment 121's registration with graphing service 101.

As a result of registration, data environment 121 may be provided with information necessary for graphing service 101 to comply with API calls from data environment 121. For example, graphing service 101 may generate a token that data environment 121 is required to include in its API calls to graphing service 101. If an API call from data environment 121 does not include the token that graphing service 101 has associated with data environment 121, then graphing service 101 will not comply with the API call.

After data environment 121 is registered with graphing service 101, graphing service 101 receives API call 122 transmitted from data environment 121 (202). API call 122 provides information about access permissions for data environment 121. The information may indicate which users have access to which data/features (e.g., data tables, applications, application components, etc.) of data environment 121 if not all of data environment 121. The users may each be identified individually or based on a group in which the user is categorized (e.g., every user in a particular workgroup may be allowed access to data environment 121). Similarly, the access permissions may include indications whether a user has privileges for data read, data write, metadata read, metadata write, and non-data—including combinations thereof. In some examples, data environment 121 provides all information about the access permissions in API call 122 even if previous instances of API call 122 have been sent from API call 122 with access permission information. In other examples, data environment 121 only provides an incremental update by including only information that has changed since a previous instance of API call 122 was sent to graphing service 101.

Upon receiving the access permission information from data environment 121 with API call 122, graphing service 101 incorporates the information into privilege graph 131 (203). Incorporating the information into privilege graph 131 along with information received from others of data environments 102, graphing service 101 is able to maintain a representation of user access permissions across all of data environments 102, not just those of data environments 102 that graphing service 101 is preconfigured to access directly. As noted above, others of data environments 102 that graphing service 101 is not configured to access directly may be configured to use the API of graphing service 101 in a manner similar to data environment 121. In some examples, the access permission information may already be formatted as required for inclusion in privilege graph 131. In other examples, graphing service 101 may reformat the information into a canonical format used for privilege graph 131. When displayed, privilege graph 131 may be displayed so that users, such as user 141, can visualize user access permissions across all of data environments 102. Changes to the access permissions can be made based on what user 141 sees. In some examples, changes made by user 141 to privilege graph 131 may be propagated to the affected ones of data environments 102 to change access permissions thereat. For example, user 141 may notice that users in a particular group should not have access to data environment 121 and may change privilege graph 131 accordingly. An API call may be made from graphing service 101 to data environment 121 indicating which users should no longer have access to data environment 121 and data environment 121 will update its access permissions accordingly.

Figure 3:
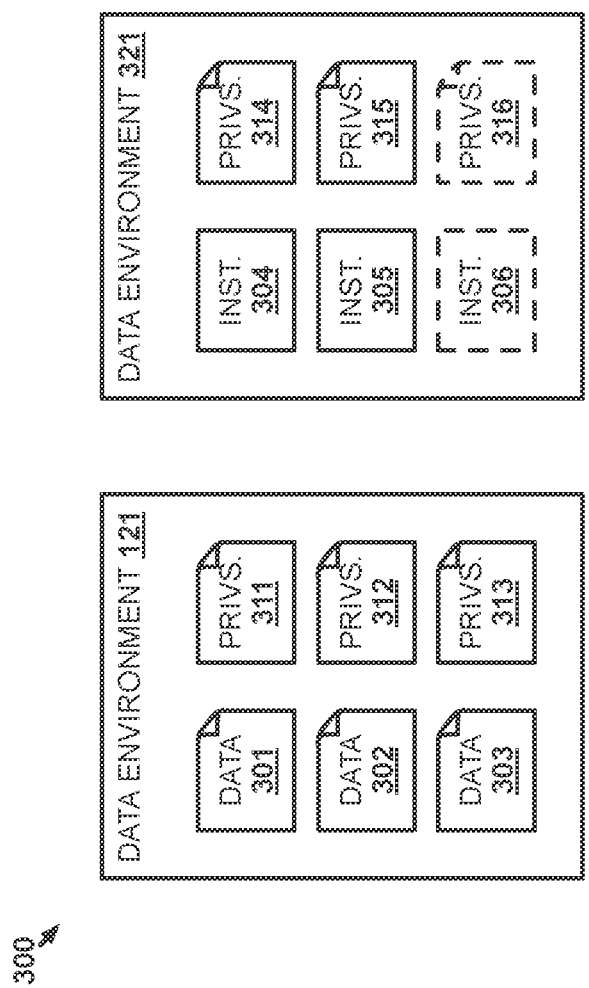
FIG. 3 illustrates data environments for pushing access-privilege from data environments to a graphing service.

FIG. 3 illustrates data environments 300 for pushing access-privilege from data environments to a graphing service. Data environments 300 are included in data environments 102. Data environments include data environment 121 and data environment 321. Data environment 121 includes data 301-303, which are different sets of data (e.g., tables, databases, etc.). The access permissions of data environment 121 are maintained separately for each of data 301-303 as privileges 311-313. In other examples, the access permissions may be combined together. Data environment 321 is another of data environments 102 along with data environment 121. Rather than being a type of data environment that only stores data, data environment 321 provides an application to users. Specifically, data environment 321 provides application instances 304-305 with another application instance 306 coming in a later example. The access permissions are maintained separately for each instance as privileges 314-315, although, the access permissions may be combined in other examples. While data environment 121 only provides data and data environment 321 only provides application instances, other types of data environments may exist in data environments 102. For example, a data environment may provide both data and an application or may provide multiple different applications rather than multiple instances of the same one. The data, application instances, or other type of electronic feature provided by a data environment are referred to below as a data source.

Figure 4:
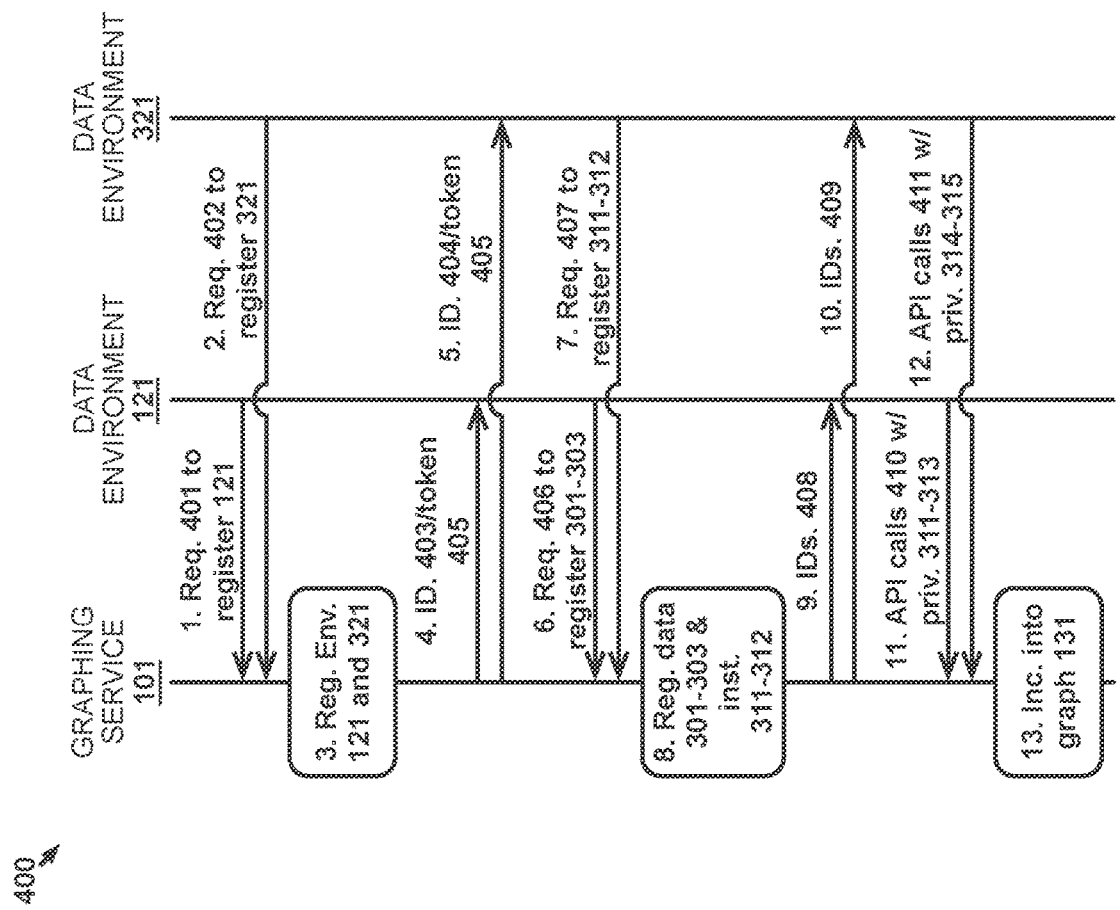
FIG. 4 illustrates an operational scenario for pushing access-privilege from data environments to a graphing service.

Depending on the type of data environment that is using the API provided by graphing service 101, different types of information may be provided. For example, defining access to certain features of an application is different than defining access to a data set. Graphing service 101 provides templates for API calls referring to different types of data source. API calls from data environment 121 to provide access information in the examples below FIG. 4 illustrates operational scenario 400 for pushing access-privilege from data environments to a graphing service. In operational scenario 400, data environment 121 transmits registration request 401 to graphing service 101 at step 1 to register data environment 121 with graphing service 101. Data environment 321 transmits registration request 402 to graphing service 101 at step 2 to register data environment 321 with graphing service 101. In this example, data environment 121 and data environment 321 are registering with graphing service 101 at substantially the same time, as may occur when graphing service 101 is first creating privilege graph 131 for data environments 102. In other examples, data environment 321 may register with graphing service 101 at a different time. For instance, data environment 321 may come online at a later date than data environment 121. Registration request 401 identifies data environment 121 to graphing service 101 (e.g., provides a name of data environment 121) and provides authentication information (e.g., username and password) that, when processed by graphing service 101, confirms that data environment 121 can access the API of graphing service 101. Registration request 402 similarly identifies data environment 321 and provides authentication information to graphing service 101. The authentication information may be the same for each of registration request 401 and registration request 402.

Upon receiving registration request 401 and registration request 402, graphing service 101 registers data environment 321 and data environment 321 at step 3. Registration request 401 and registration request 402 may each be an API call to graphing service 101's API or may take some other format. Registration in this example includes generating environment identifier 403 for data environment 121 and environment identifier 404 for data environment 321. In other examples, graphing service 101 may instead use an identifier provided by data environment 121 and data environment 321, such as that included in registration request 401 and registration request 402, respectively. In some examples, user 141 may name data environment 121 and data environment 321 to generate environment identifier 403 and environment identifier 404. Graphing service 101 also creates token 405 unless token 405 has already been created when previously registering a data environment. In this example, a single token 405 is used for data environment 321 and data environment 121 but, in other cases, a distinct token may be generated for each data environment.

Graphing service 101 confirms the registration of data environment 121 and sends environment identifier 403 and token 405 at step 4 to data environment 121. Similarly, graphing service 101 confirms the registration of data environment 321 and sends environment identifier 404 and token 405 at step 5 to data environment 321. Data environment 121 needs to include both environment identifier 403 and token 405 in future API calls to graphing service 101 for graphing service 101 to comply with the calls. Likewise, data environment 321 needs to send environment identifier 404 and token 405 in future API calls to graphing service 101 for graphing service 101 to comply with the calls. Otherwise, graphing service 101 will not trust that the API calls are coming from a registered source.

In addition to registering each of data environment 121 and data environment 321 as a whole, data environment 121 and data environment 321 register the particular data sources therein, as each data source is associated with different access privileges. As such, data environment 121 sends registration request 406 at step 6 to graphing service 101 and data environment 321 sends registration request 407 at step 7 to graphing service 101. Registration request 406 requests data 301-303 be each registered as data sources and registration request 407 requests that application instances 304-305 be each registered as data sources. In some examples, a separate request may be required for each data source rather than the single request from each of data environment 121 and data environment 321 in this example. Like registration request 401 and registration request 402, registration request 406 and registration request 407 may be API calls to graphing service 101's API or may take some other format.

Responsive to registration request 406 and registration request 407, graphing service 101 registers data 301-303 and application instances 311-312 at step 8. Registration creates source identifiers 408 for each of the data sources (i.e., data 301-303) in data environment 121 and source identifiers 409 for each of the data sources (i.e., application instances 304-305) in data environment 321. Source identifiers 408 are sent to data environment 121 at step 9 and source identifiers 409 are sent to data environment 321 as step 10. After receiving source identifiers 408, data environment 121 sends API calls 410 with privileges 311-313 at step 11 to graphing service 101. Each of API calls 410 corresponds to one of privileges 311-313 and identifies the data source using a respective one of source identifiers 408 corresponding to the data course. Similarly, after receiving source identifiers 409, data environment 321 sends API calls 411 with privileges 314-315 at step 12 to graphing service 101. Each of API calls 411 corresponds to one of privileges 314-315 and identifies the data source using a respective one of source identifiers 409 corresponding to the data source. In other examples a single API call may be sent from each of data environment 121 and data environment 321 for all privileges thereat rather than one API call per data source as occurs here. Each of API calls 410 identifies data environment 121 using environment identifier 403, identifies the data sources using the particular data source using a corresponding one of source identifiers 408, and token 405. Graphing service 101, therefore, knows to which of the data sources the particular API call is referring and the inclusion of token 405 authenticates the call. Likewise, each of API calls 411 identifies data environment 321 using environment identifier 404, identifies the data source using the particular data source using a corresponding one of source identifiers 409, and token 405.

Upon receiving privileges 311-315, graphing service 101 incorporates privileges 311-315 into privilege graph 131 at step 13. In some examples, privilege graph 131 may be initially created using privileges 311-315 or may simply update an already existing privilege graph 131 having access information for other data environments of data environments 102.

Figure 5:
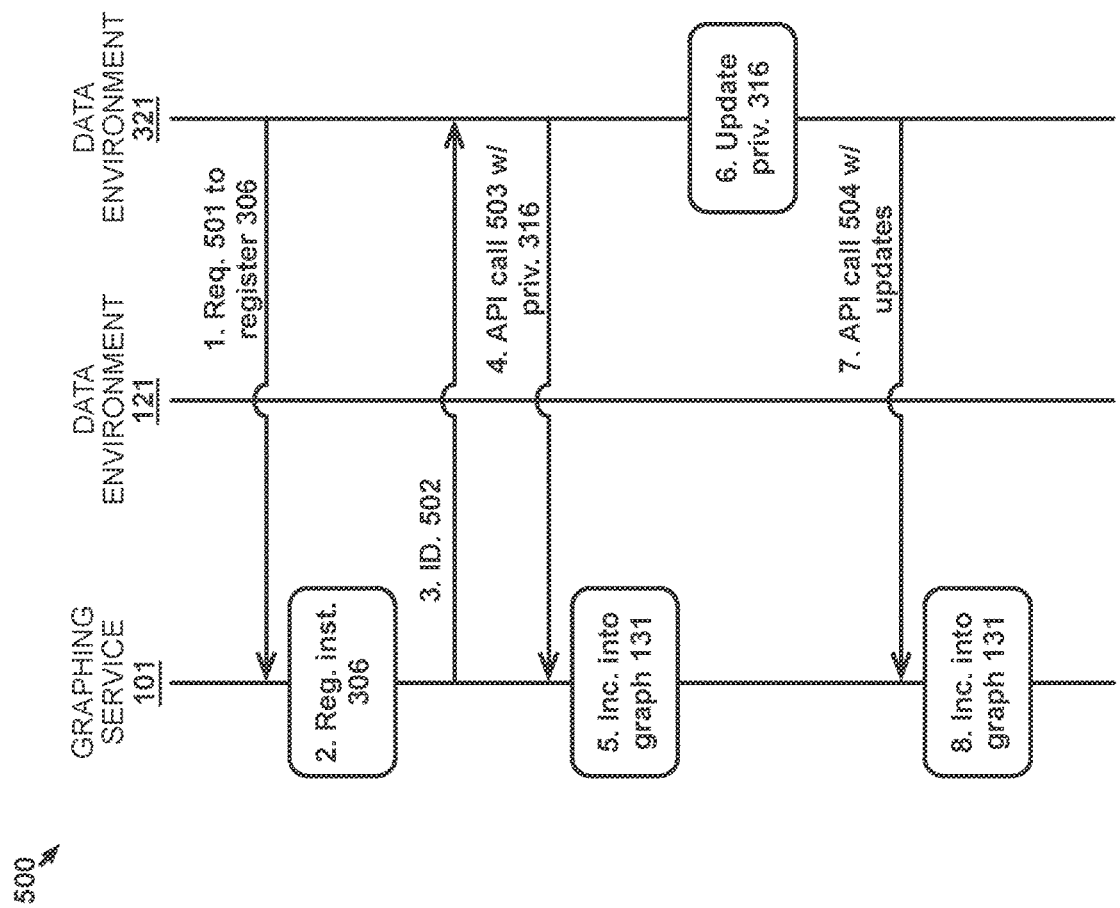
FIG. 5 illustrates an operational scenario for pushing access-privilege from data environments to a graphing service.

FIG. 5 illustrates operational scenario 500 for pushing access-privilege from data environments to a graphing service. In operational scenario 500, application instance 306 is instantiated within data environment 321 after the most recent update of access permission information to graphing service 101. The most recent update may have occurred with API calls 411 above or additional updates may have occurred subsequent to API calls 411. Since application instance 306 is not yet registered with graphing service 101, data environment 321 transmits registration request 501 at step 1 to graphing service 101. Graphing service 101 registers application instance 306 at step 2 and sends source identifier 502, which was created during that registration, to data environment 321 at step 3. Data environment 321 now has the two respective source identifiers 409 for instances 304-405 and source identifier 502 for application instance 306. After registration, data environment 321 sends API call 503 with privileges 316 at step 4 so that graphing service 101 can include privileges 316 in privilege graph 131 at step 5. API call 503 includes environment identifier 404 to identify data environment 321, source identifier 502 to identify application instance 306, and token 405 to authenticate API call 503 to graphing service 101.

After some time has elapsed since privileges 316 were initially sent to graphing service 101 with API call 503, privileges 316 are updated in data environment 321 at step 6. For example, a user that did not have access to application instance 306 previously may now have access. Since privilege graph 131 does not yet reflect that change, data environment 321 sends API call 504 with the updates to privileges 316 at step 7. API call 504 may be a different type of call than API call 503 because API call 503 included all of privileges 316 while API call 504 may only indicate the changes made during the update. Although, similar to API call 503, API call 504 includes environment identifier 404 to identify data environment 321, source identifier 502 to identify application instance 306, and token 405 to authenticate API call 503 to graphing service 101. When updates are made to any of the other privileges 311-315, data environment 121 and data environment 321 may similarly send API calls with updates to graphing service 101. The update calls may be triggered in response to changes or may occur on some other schedule (e.g., once an hour), which may be dependent on user preferences.

Figure 6:
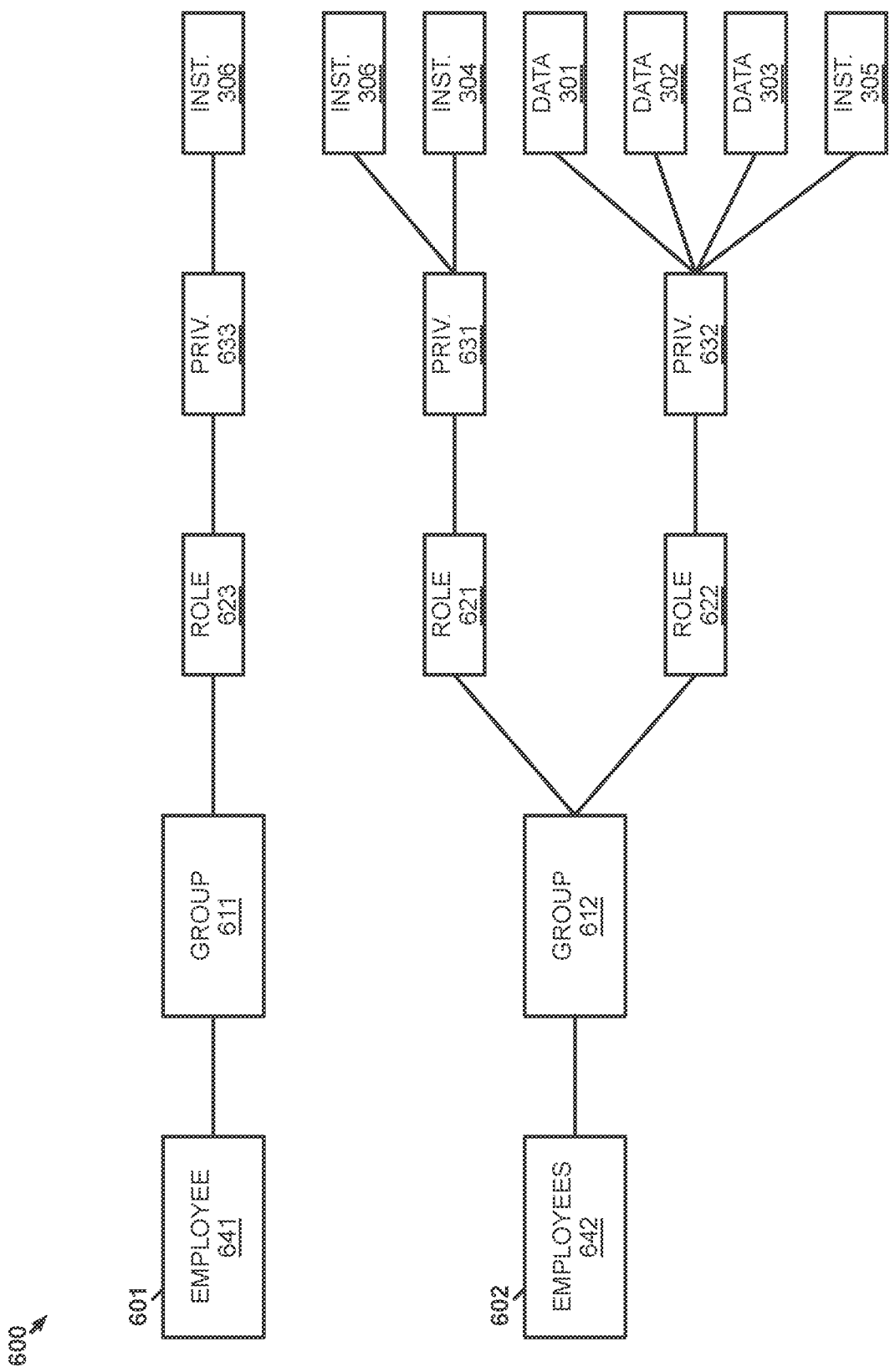
FIG. 6 illustrates a subgraph and privilege graph for pushing access-privilege from data environments to a graphing service.

FIG. 6 illustrates graphs 600 for pushing access-privilege from data environments to a graphing service. Graphs 600 include subgraph 601 and privilege graph 602. Subgraph 601 is an example subgraph created by graphing service 101 to represent an update to privileges 316 in the example above. The update to privileges 316 includes privilege 633 that allows employee 641 to access application instance 306. Graphing service 101 obtains identity information about employee 641 from one or more of identity environments 104 to determine that employee 641 is in group 611 and fills role 623. Graphing service 101 creates the nodes and connections of subgraph 601 from that information.

Privilege graph 602 is an example of privilege graph 131 to which subgraph 601 is to be incorporated. As can be seen in privilege graph 602, employees 642 in group 612 and filing role 621 are already allowed to access application instance 306 along with application instance 304 based on privileges 631. Privilege graph 602 also shows that employees 642 in group 612 that fill role 622 have privileges 632 that allow them to access data 301-303 and application instance 305.

Figure 7:
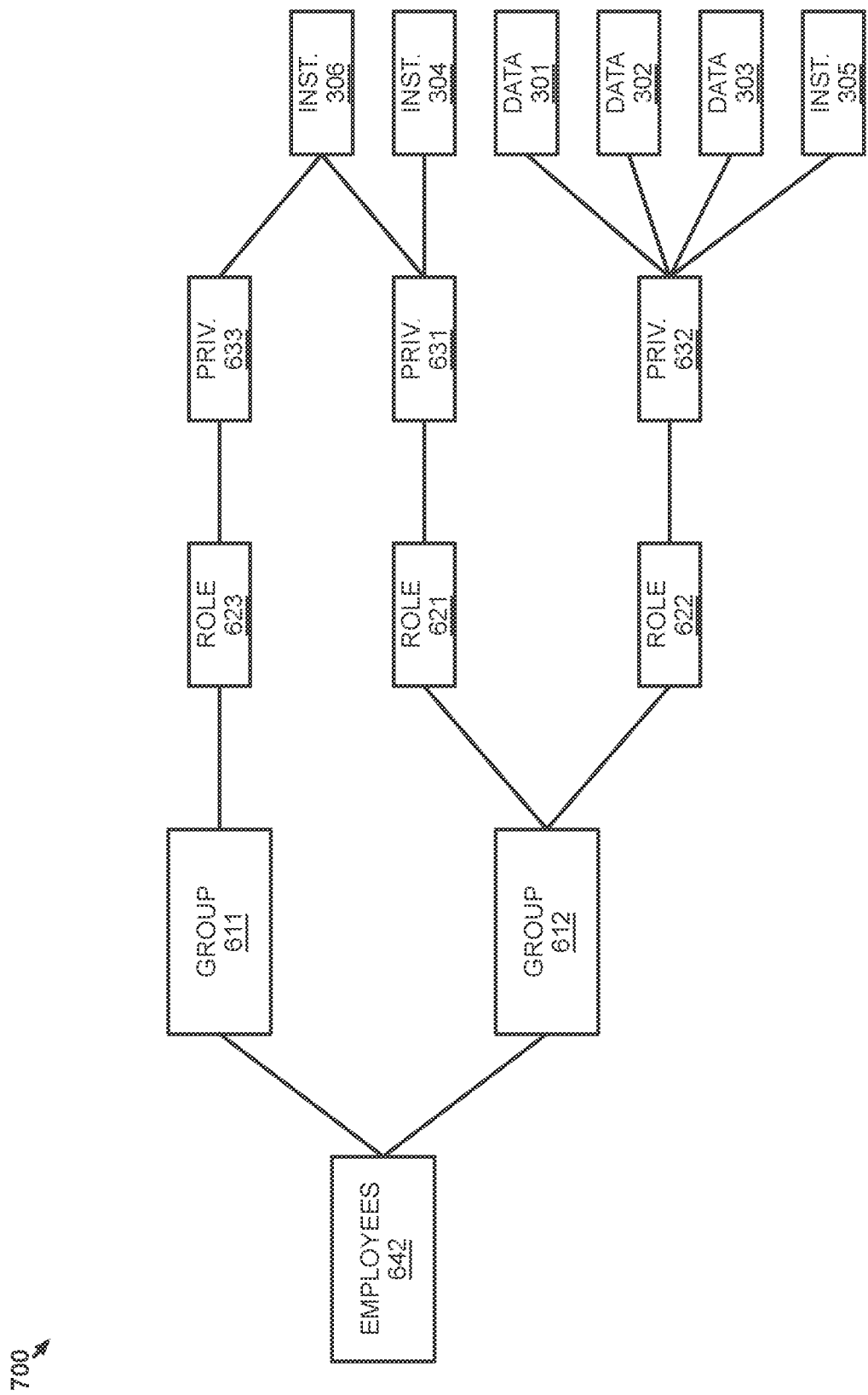
FIG. 7 illustrates a privilege graph for pushing access-privilege from data environments to a graphing service.

FIG. 7 illustrates privilege graph 700 for pushing access-privilege from data environments to a graphing service. Privilege graph 700 is an example of privilege graph 602 after incorporation of subgraph 601. When combining subgraph 601 into privilege graph 602, graphing service 101 included employee 641 with the other employees 642. Since one of employees 642 (i.e., employee 641) is now in group 611, the node for employees 642 branches to the node for group 611 in addition to the node for group 612. The node for group 611 then branches to the node for role 623, which branches to the node for privileges 633. The node for privileges 633 then branches to the node for application instance 306 to indicate that an employee of employees 642 having the attributes of group 611 and role 623 will have privileges 633 and be allowed access to application instance 306. In this example, only employee 641 will satisfy those attributes but, over time, more employees may be added to privilege graph 700 having the same attributes.

In some examples, graphing service 101 may use privilege graph 700 as a proxy authorization system to determine whether a user can access a data source before the user contacts the data source. For example, if user 141 is employee 641 and wants to access application instance 306, then graphing service 101 references privilege graph 700 to determine that user 141 can access application instance 306. Graphing service 101 may then allow user 141 to data environment 321 via user terminal 103 and data environment 321 may then perform its own determination about whether user 141 can access application instance 306 (if privilege graph 700 is up to date, user 141 should be allowed). Alternatively, graphing service 101 may indicate to data environment 321 that user 141 has already been authenticated/authorized (e.g., graphing service 101 may act like a single sign (SSO) for data environment 321 or others of data environments 102).

Figure 8:
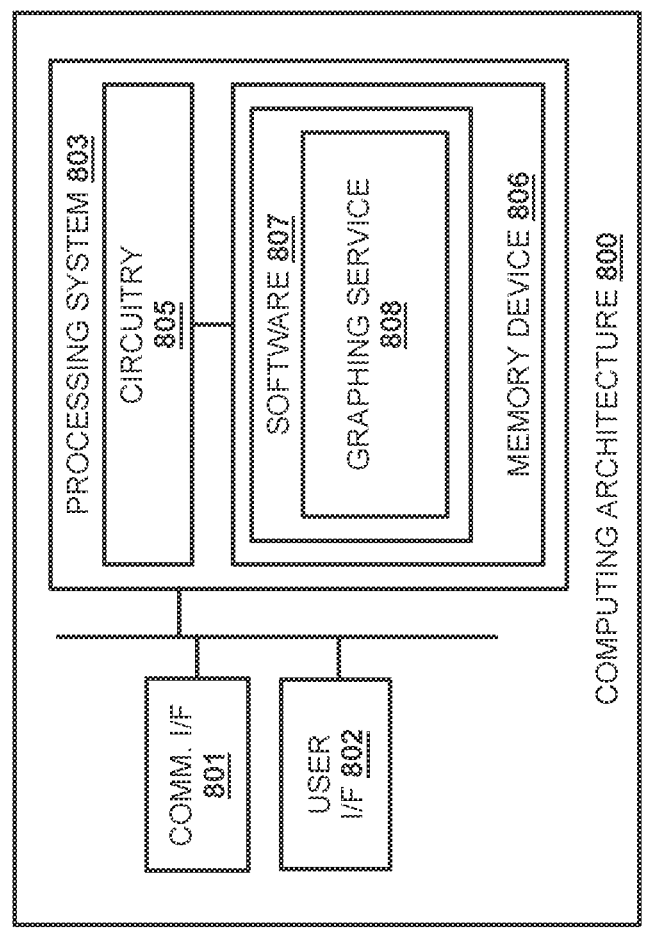
FIG. 8 illustrates a computing architecture for pushing access-privilege from data environments to a graphing service.

FIG. 8 illustrates computing architecture 800 for pushing access-privilege from data environments to a graphing service. Computing architecture 800 is an example computing architecture for implementing graphing service 101. A similar architecture may also be used for other systems described herein, such as user terminal 103, although alternative configurations may also be used. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises one or more computer readable storage media, such as a disk drive, flash drive, data storage circuitry, or some other memory apparatus. In no examples would a computer readable storage medium of memory device 806, or any other computer readable storage medium herein, be considered a transitory form of signal transmission (often referred to as "signals per se"), such as a propagating electrical or electromagnetic signal or carrier wave. Operating software 807 comprises computer programs, firmware, or some other form of machine-readable processing instructions. Operating software 807 includes graphing service module 808. Operating software 807 may further include an operating system, utilities, drivers, network interfaces, applications, or some other type of software. When executed by processing circuitry 805, operating software 807 directs computing architecture 800 to operate as described herein.

In particular, graphing service module 808 directs computing architecture 800 to register a data environment to enable the data environment to use Application Programming Interface (API) calls. Graphing service module 808 further directs computing architecture 800 to receive an API call transmitted from the data environment. The API call provides information about access permissions for the data environment. Graphing service module 808 also directs computing architecture 800 to incorporating the information into a privilege graph representing data access authorizations.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   in a graphing service:
   registering a data environment with the graphing service to enable the data environment to use Application Programming Interface (API) calls of the graphing service;
   registering a data source of the data environment with the graphing service;
   receiving an API call transmitted from the data environment, wherein the API call provides, to the graphing service, information about access permissions for the data environment and includes a first identifier for the data source and a second identifier for the data environment; and
   incorporating the information into a privilege graph representing data access authorizations.

2. The method of claim 1, wherein the information comprises an incremental update of the access permissions since a previous instance of the API call was received from the data environment.

3. The method of claim 1, wherein the data environment transmitted the API call after a time has elapsed since a previous instance of the API call was transmitted.

4. The method of claim 1, wherein the data environment transmitted the API call in response to a change in the access permissions.

5. The method of claim 1, comprising:
   providing a token to the data environment, wherein the token is included with the API call to authenticate the data environment to the graphing service.

6. The method of claim 1, comprising:
   binding the data environment to a type of data environment, wherein the type corresponds to a template to which the information conforms.

7. The method of claim 1, wherein incorporating the information into the privilege graph comprises:
   forming a subgraph of the information; and
   combining the subgraph into the privilege graph.

8. The method of claim 7, comprising:
   before combining the subgraph into the privilege graph, translating the subgraph into a canonical schema used by the privilege graph.

9. An apparatus implementing a graphing service, the apparatus comprising:
one or more computer readable storage media;
a processing system operatively coupled with the one or more computer readable storage media; and
program instructions stored on the one or more computer readable storage media that, when read and executed by the processing system, direct the apparatus to:
register a data environment with the graphing service to enable the data environment to use Application Programming Interface (API) calls of the graphing service;
register a data source of the data environment with the graphing service;
receive an API call transmitted from the data environment, wherein the API call provides, to the graphing service, information about access permissions for the data environment and includes a first identifier for the data source and a second identifier for the data environment; and
incorporate the information into a privilege graph representing data access authorizations.

10. The apparatus of claim 9, wherein the information comprises an incremental update of the access permissions since a previous instance of the API call was received from the data environment.

11. The apparatus of claim 9, wherein the data environment transmitted the API call after a time has elapsed since a previous instance of the API call was transmitted.

12. The apparatus of claim 9, wherein the data environment transmitted the API call in response to a change in the access permissions.

13. The apparatus of claim 9, wherein the program instructions direct the processing system to:
provide a token to the data environment, wherein the token is included with the API call to authenticate the data environment to the graphing service.

14. The apparatus of claim 9, wherein the program instructions direct the processing system to:
bind the data environment to a type of data environment, wherein the type corresponds to a template to which the information conforms.

15. The apparatus of claim 9, wherein to incorporate the information into the privilege graph, the program instructions direct the processing system to:
form a subgraph of the information; and
combine the subgraph into the privilege graph.

16. The apparatus of claim 15, wherein the program instructions direct the processing system to:
before combining the subgraph into the privilege graph, translate the subgraph into a canonical schema used by the privilege graph.

17. One or more non-transitory computer readable storage media having program instructions stored thereon for implementing a graphing service, the program instructions, when read and executed by a processing system, direct the processing system to:
register a data environment with the graphing service to enable the data environment to use Application Programming Interface (API) calls of the graphing service;
register a data source of the data environment with the graphing service;
receive an API call transmitted from the data environment, wherein the API call provides, to the graphing service, information about access permissions for the data environment and includes a first identifier for the data source and a second identifier for the data environment; and
incorporate the information into a privilege graph representing data access authorizations.

18. The one or more computer readable storage media of claim 17, wherein the information comprises an incremental update of the access permissions since a previous instance of the API call was received from the data environment.

* * * * *